No. 641,648. Patented Jan. 16, 1900.
H. E. RIDER.
DEVICE FOR APPLYING SEALING WAX.
(Application filed Oct. 19, 1898.)//
(No Model.)
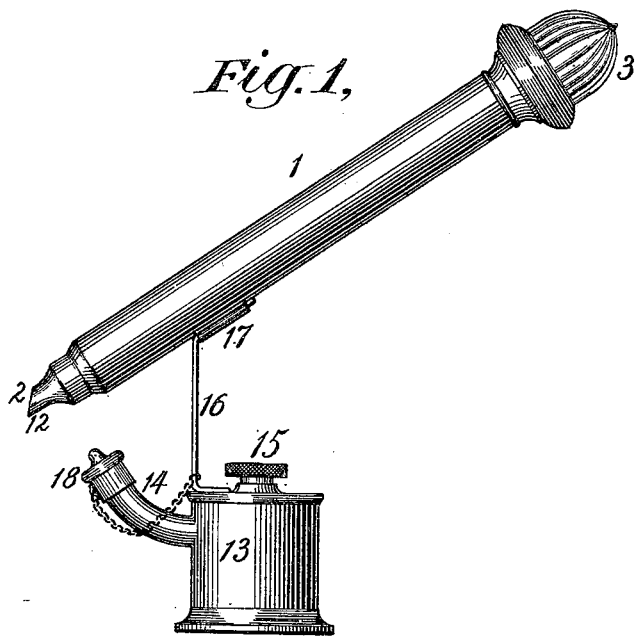
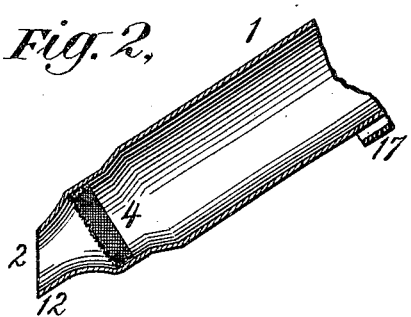
WITNESSES: INVENTOR
Herbert E. Rider
BY
Henry D. Williams
ATTORNEY

UNITED STATES PATENT OFFICE.

HERBERT E. RIDER, OF NEW YORK, N. Y., ASSIGNOR TO STANLEY & PATTERSON AND CELINDA P. ROBINSON, OF SAME PLACE.

DEVICE FOR APPLYING SEALING-WAX.

SPECIFICATION forming part of Letters Patent No. 641,648, dated January 16, 1900.

Application filed October 19, 1898. Serial No. 694,006. (No model.)

*To all whom it may concern:*

Be it known that I, HERBERT E. RIDER, a citizen of the United States, and a resident of the city of New York, borough of Manhattan, county of New York, and State of New York, have invented certain new and useful Improvements in Devices for Applying Sealing-Wax, of which the following is a specification, reference being had to the accompanying drawings, forming part hereof.

This invention relates to devices for applying sealing-wax, and has for its principal objects to prevent too rapid an outflow of the sealing-wax and especially to prevent the outflow of insufficiently-melted portions and to guide and shield the sealing-wax as it escapes from the holding device.

The improvements embodying the present invention are designed for use with a device for applying sealing-wax of the construction covered by my prior patent, No. 600,992, dated March 22, 1898; and my invention includes various improvements upon the construction of sealing-wax device shown in said patent.

In the accompanying drawings, showing embodiments of my invention, Figure 1 is a side elevation of a device for applying sealing-wax. Fig. 2 is an enlarged vertical section of part of the same in proximity to the outflow-orifice, and Fig. 3 is a longitudinal section of a modified construction.

A tubular casing 1, tapering or reduced at one end—the left-hand end as shown—and having a small or restricted orifice 2 at this reduced end and having a removable cap 3 at the other end, forms the receptacle for the sealing-wax. The sealing-wax is usually in stick form and may fit within the casing so as to move freely therein or may be considerably smaller than the casing.

Within the casing 1 at the restricted end thereof is located the means for preventing the outflow of insufficiently-melted portions of sealing-wax, such means comprising a screen or sieve in both constructions shown, the screen or sieve 4 (shown in Fig. 2) being set in a step at the restricted end of the casing and having a flat screen diaphragm extending across the tubular casing in proximity to the orifice and the screen or sieve 5 (shown in Fig. 3) being of conical shape and having a curved screen diaphragm somewhat nearer the orifice than in the other construction. Both screens are of substantially cup-shaped form, with their sides against the walls of the casing.

When the sealing-wax is heated, it quickly becomes soft, and I have found that with no means to prevent the escape of unmelted portions it frequently happens that lumps of unmelted wax flow out with the liquid and that after the heating has been continued for some time the sealing-wax flows out so freely as to be unmanageable. These objections are entirely obviated by my present invention, and a uniform outflow of melted sealing-wax is thereby attained under all conditions. It is of course obvious that a screen of perforated metal may be employed in place of the wire-screens shown, or other modified constructions may be used.

The melted sealing-wax as it flows out of the casing must be shielded from the heating-flame and properly guided, so that it will uniformly fall at the desired place on the flap of the envelop or package, and I have found that by providing a shield spout or lip—such as is shown at 12, Figs. 1 and 2, or at 11, Fig. 3—these desirable objects are satisfactorily attained.

While it is desirable to hold the sealing-wax casing in inclined position when in use, so that the melted wax will run out by gravity, I have found that it is frequently not desirable to have the reservoir for inflammable fluid in such inclined position, and I therefore provide a reservoir 13, provided with an upwardly and rearwardly extending angular arm 16, the upper bent end of the arm 16 removably entering a socket 17 in the sealing-wax casing 1, whereby when the reservoir 13 rests upon a horizontal base the sealing-wax casing 1 is supported in inclined position. The casing 1 may be removed and another casing substituted whenever desired. The reservoir 13 may be provided with a removable cap 15 for convenience in filling or charging it and has a burner 14, located under the reduced end of the sealing-wax casing 1 and which may be provided with a removable cap 18 to prevent evaporation when not in use.

In some instances a Bunsen burner or other form of burner may be substituted for the fluid-burner shown or the sealing-wax device may not be provided with a burner. The latter construction is shown in Fig. 3, and in using this construction the casing may be held by hand over any suitable burner.

It is evident that modifications may be made in the construction described and shown without departing from my invention and that parts of my invention may be separately used.

What I claim, and desire to secure by Letters Patent, is—

1. A device for applying sealing-wax comprising an incasing envelop for the sealing-wax having an orifice at one end and means located in proximity to said orifice for preventing the outflow of unmelted sealing-wax, substantially as set forth.

2. A device for applying sealing-wax comprising an incasing envelop for the sealing-wax having an orifice at one end and a screen interposed in proximity to said orifice, substantially as set forth.

3. A device for applying sealing-wax comprising a casing having an orifice at one end and a cup-shaped screen located within said casing in proximity to said orifice, substantially as set forth.

4. A device for applying sealing-wax comprising an incasing envelop having a restricted orifice at one end and a shield-spout at such orifice, substantially as set forth.

5. A device for applying sealing-wax comprising an incasing envelop having an orifice at one end and a screen interposed in proximity to said orifice and a shield-spout at said orifice, substantially as set forth.

6. A device for applying sealing-wax comprising an incasing envelop having an orifice at one end, a reservoir for inflammable fluid, and means for supporting said envelop in an inclined position on said reservoir, substantially as set forth.

7. A device for applying sealing-wax comprising a casing for the sealing-wax having a restricted orifice at one end, a screen located within said casing in proximity to said orifice, a shield-spout at said orifice, a burner and reservoir for inflammable fluid, and an angular arm thereon supporting said casing in inclined position, substantially as set forth.

Signed at New York, N. Y., this 18th day of October, 1898.

HERBERT E. RIDER.

Witnesses:
HENRY D. WILLIAMS,
HERBERT H. GIBBS.